United States Patent
Gladstone

(10) Patent No.: US 9,639,799 B2
(45) Date of Patent: May 2, 2017

(54) SYSTEM, METHOD AND APPARATUS FOR MATRIX-LESS INLAY DESIGN

(75) Inventor: Sam M. Gladstone, Buford, GA (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 73 days.

(21) Appl. No.: 14/236,832

(22) PCT Filed: Jul. 31, 2012

(86) PCT No.: PCT/US2012/049001
§ 371 (c)(1),
(2), (4) Date: Feb. 3, 2014

(87) PCT Pub. No.: WO2013/019797
PCT Pub. Date: Feb. 7, 2013

(65) Prior Publication Data
US 2014/0158777 A1    Jun. 12, 2014

Related U.S. Application Data

(60) Provisional application No. 61/513,955, filed on Aug. 1, 2011.

(51) Int. Cl.
*G06K 19/06* (2006.01)
*G06K 19/077* (2006.01)
*H01Q 1/22* (2006.01)

(52) U.S. Cl.
CPC . *G06K 19/07749* (2013.01); *G06K 19/07718* (2013.01); *G06K 19/07752* (2013.01); *H01Q 1/2225* (2013.01); *Y10T 29/49016* (2015.01)

(58) Field of Classification Search
USPC .......................... 235/492, 451, 487; 361/737
See application file for complete search history.

(56) References Cited

U.S. PATENT DOCUMENTS

| | | | |
|---|---|---|---|
| 7,268,736 | B1 | 9/2007 | Tikhov et al. |
| 7,510,985 | B1 | 3/2009 | Boenke |
| 2007/0188327 | A1 | 8/2007 | Keeton |
| 2008/0283615 | A1 | 11/2008 | Finn |
| 2012/0040128 | A1* | 2/2012 | Finn ................. G06K 19/07783 428/96 |

FOREIGN PATENT DOCUMENTS

| | | |
|---|---|---|
| DE | 102006059521 | 6/2008 |
| WO | 2011054697 | 5/2011 |

OTHER PUBLICATIONS

International Search Report dated Oct. 10, 2012 for International Application No. PCT/US2012/049001 filed Jul. 31, 2012.
Written Opinion of the International Searching Authority dated Oct. 10, 2012 for International Application No. PCT/US2012/049001 filed Jul. 31, 2012.

* cited by examiner

*Primary Examiner* — Ahshik Kim
(74) *Attorney, Agent, or Firm* — Avery Dennison Retail Information Services, LLC

(57) ABSTRACT

According to at least one exemplary embodiment, a system, method and apparatus for a matrix-less inlay design may be described. The system, method and apparatus can include the formation of an inlay with a pattern, such as a starburst pattern, surrounding an antenna that can be formed during laser ablation process. The starburst pattern may be utilized to provide for the efficient generation of inlays of varying sizes.

17 Claims, 4 Drawing Sheets

SYSTEM, METHOD AND APPARATUS FOR MATRIX-LESS INLAY DESIGN

CROSS-REFERENCE TO RELATED APPLICATION

The present application is a 371 of International Application No. PCT/US2012/049001, which was published in English on Feb. 7, 2013, which claims priority to U.S. Provisional Application No. 61/613,955 filed Aug. 1, 2011 which is incorporated herein by reference in its entirety.

BACKGROUND OF THE INVENTION

RFID inlays are often utilized for the transmission of data, typically data regarding an article which is associated with the RFID inlay. The inlays are typically formed on a sheet or label and have a variety of components, such as an antenna and chip, disposed thereon. The inlays may thus be produced in bulk and can be separated to provide individual inlays that may be associated with or coupled to an article.

Known methods of forming inlays can include the lamination of an aluminum roll material directly to a PET substrate, which can form a base material or substrate for the inlay. Any excess metal on the inlay may then be removed. An adhesive pattern can also be printed onto the PET in the location of the inlay. Laser ablation may then be performed and a matrix of unwanted aluminum that can remain may thus be removed.

However, when these methods of forming RFID inlays are utilized with certain types of inlays, for example small inlays or inlays having spirals with a large number of loops, a variety of problems can arise. For example, aluminum used on the inlay has been known to move or wander as a result of heat from the laser during or following ablating, as well as from the temperature of the adhesive used for the printed pattern. On smaller inlays, movement by as little as about 1 micron can cause a shift in the performance of an inlay or the frequency of operation due to the nature and orientation of loops on a spiral. Additionally, in some situations, the shifting or wandering can be significant enough to cause one or more electrical shorts. Also, in some small inlays, if the matrix was pulled from the PET substrate, there often is not enough surface area to hold the inlay on the substrate and the inlays could be ripped, rendering the inlay inoperable or otherwise malformed.

Further, on some inlays, it can be difficult to align a printed adhesive pattern inside the footprint of an inlay. Additionally, the adhesive pattern can become smudged or smeared, leaving the matrix strip operation incomplete and affecting the functionality of the inlay.

In still other manners of forming inlays, the laser cutting production speed is significantly slowed because of the high number of spiral ablation loops running around the inlay. Further, the PET under the inlay can be burned by repeated heat due to both the latent heat from the laser ablation and proximity of the spiral paths, which causes areas of the inlay to be heated repeatedly. Thus, in such circumstances, the PET can become brittle or warp, which in turn causes problems with the flatness of the roll and, ultimately, chip bonding and die cut label conversion.

Thus, it may be desired to form an RFID inlay that is less susceptible to the damage such as that describe above in order to increase the functionality and yield of inlays produced.

SUMMARY OF THE INVENTION

According to at least one exemplary embodiment, a system, method and apparatus for a matrix-less inlay design may be described. The system, method and apparatus can include the formation of an inlay with a pattern, such as a starburst pattern, surrounding an antenna that can be formed during laser ablation process. The starburst pattern may be utilized to provide for the efficient generation of inlays of varying sizes.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
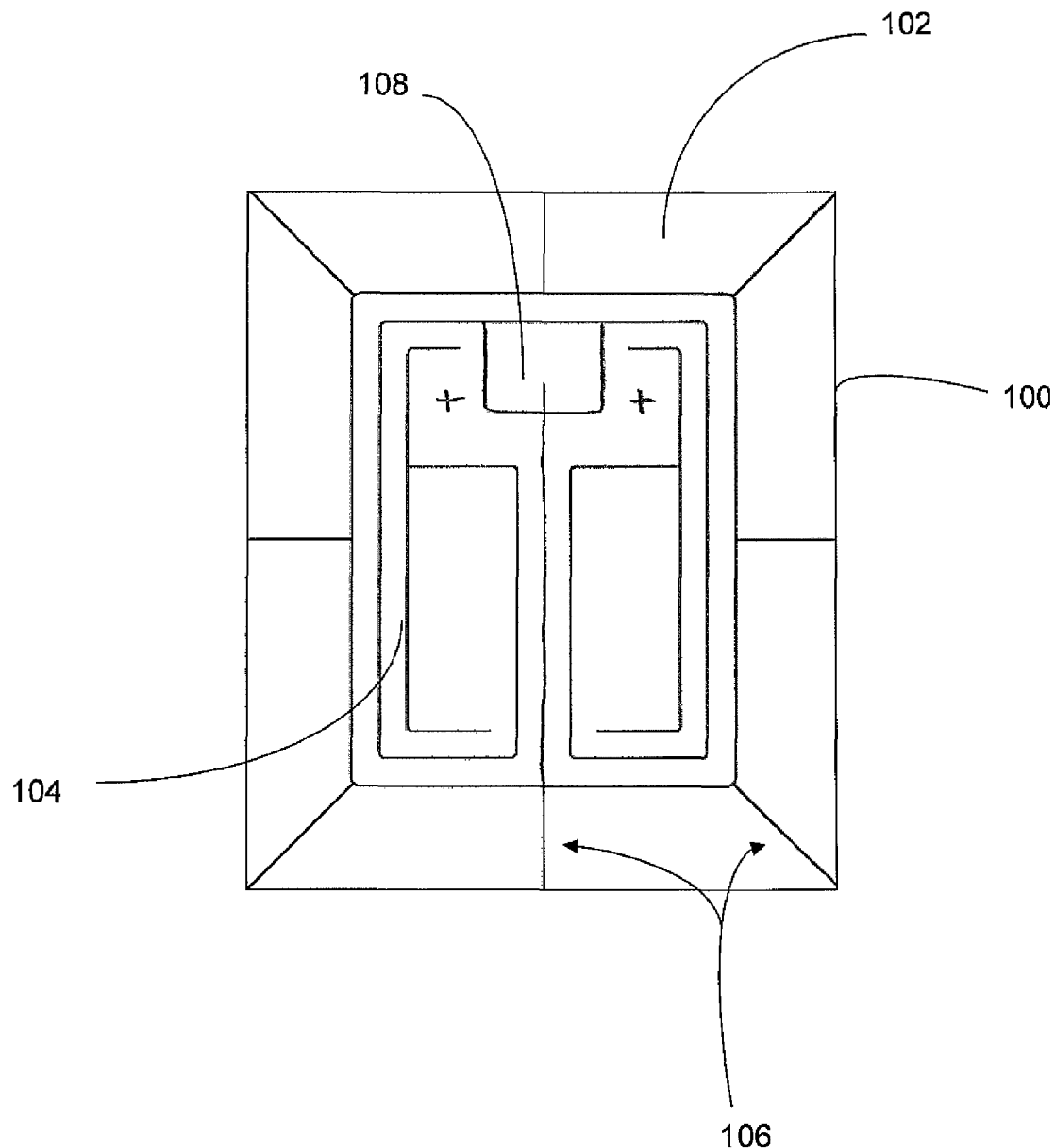
FIG. 1 is an exemplary view of an RFID inlay.
Figure 2:
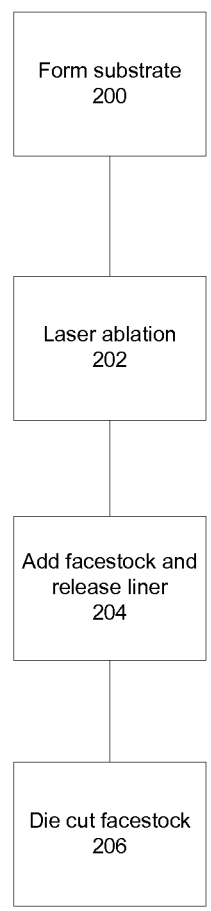
FIG. 2 is an exemplary flow chart describing steps for forming an RFID label.
Figure 3:
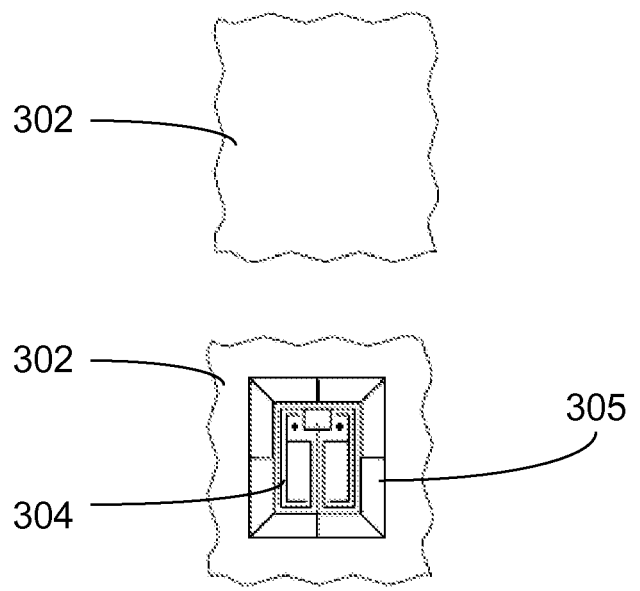
FIG. 3 is an exemplary diagram showing the formation of an RFID inlay.
Figure 3:
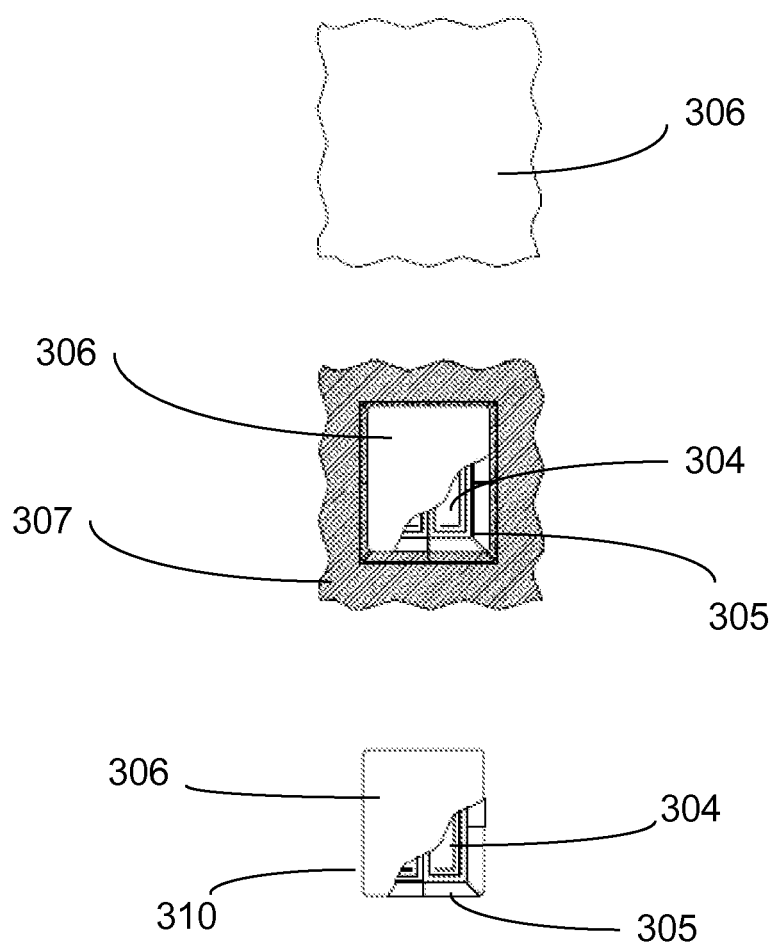

Generally referring to FIGS. 1-3, systems, methods and apparatuses for making and using RFID inlays may be shown. An RFID inlay may be formed in any size and may be utilized in any desired fashion. Additionally, any number of RFID inlays may be quickly and efficiently manufactured in bulk while having high degrees of functionality and limited yield loss.

In exemplary FIG. 1, an RFID inlay 100 may be shown. RFID inlay 100 may be any size, for example about 7 mm by about 9 mm, although any size of RFID inlay is contemplated by the description herein. RFID inlay 100 may further be formed in any of a variety of manners. For example, an inlay substrate 102 may be formed for inlay 100. Inlay substrate 102 may be PET (polyethylene terephthalate) material with an aluminum laminate, for example, where the PET can be molecularly adhered or molecularly bonded to the aluminum material. The use of such an inlay material 102 may assist in preventing or limiting the movement of aluminum during laser ablation or flip chip bonding operations that can be utilized in the formation of inlay 100.

Still referring to exemplary FIG. 1, antenna 104 may be disposed on inlay 100 in any desired manner, for example through laser ablation of inlay substrate 102. In addition to antenna 104, an additional pattern, pattern 106, may further be added to inlay 100 at this time. Pattern 106, which may be in the form of a starburst pattern, can be formed substantially concurrently with antenna 104, or as part of the same process, for example by laser ablation of substrate 102. Also, pattern 106 may be made such that it is formed in an area substantially around inlay 100. During laser ablation, for example, a laser cut path used for antenna 104 may be modified such that extra cut lines can be made at desired locations. These locations can be, for example, can be formed around inlay 100 about every approximately 45 degrees extending or moving outwards from inlay 100. Pattern 106 may further be formed such that it is electrically inert. Thus, in some exemplary embodiments, pattern 106 may not affect the performance or frequency of inlay 100. In one example, pattern 106 may be rendered electrically inert by forming it such that is it larger than a die cut label footprint or size. Thus, during a die cut process, metal associated with pattern 106 may be such that it is not connected in a loop around inlay 100. This can further be shown in exemplary FIG. 3, described below.

In still further exemplary embodiments, the length and/or dimensions of pattern 106 may be varied as desired. For example, in some examples, the length of pattern may be altered as a result of the size of a label that inlay 100 may be coupled to or due to die cut tolerance.

In further exemplary embodiments, as the formation of pattern 106 may be integrated into the laser ablation that may be utilized on inlay 100, no further steps be added to the formation of inlay 100. For example, as the process for forming pattern 106 is combined with the laser ablation process, no extra steps may be needed for stripping a matrix of additional material or isolating inlay 100 for die cutting for a label conversion process. This can be further described below with respect to exemplary FIGS. 2 and 3. Also, the pattern 106 can be utilized to prevent warping of inlay 100 that has been known to occur during laser ablation and inlay 100 can remain stable during the coupling or bonding of a chip 108, such as a flip chip, to inlay 100 as well during the label conversion process.

In a further exemplary embodiment, shown in the flow chart of FIG. 2 and the diagrams of FIG. 3, steps for making a matrix-less inlay may be shown. In step 200, a substrate for an inlay, such as an aluminum laminate 302 or, in some exemplary embodiments, a bonded PET/aluminum laminate, may be formed. Next, in step 202, laser ablation of the aluminum laminate 302 can be performed to form a antenna 304 as well as a pattern 305, such as a starburst pattern, on aluminum laminate 302. Pattern 305 may substantially surround antenna 304, as described in previous exemplary embodiments. Additionally, at or about this time, a chip may be attached. The chip attachment may utilize any type of chip and any type of attachment methodology, for example flip chip bonding. Then, in step 204, facestock and release liner may be added over the antenna pattern 304 and pattern 305. The facestock 306 and liner may substantially or completely cover circuit 304 and pattern 305, as well as aluminum laminate 302.

In further exemplary embodiments, and still referring to FIGS. 2 and 3, in step 206, die cutting may take place. Such die cutting can remove portions of facestock 306 and aluminum laminate 302, as well as portions of pattern 305. Removed portions 307 may be shown as the diagonal hatch area. As demonstrated with the removed portions 307, outer portions or a periphery of pattern 305 may be removed in the die cutting process. A substantially completed inlay 310 may then be formed. Inlay 310 is shown as a cutaway in exemplary FIG. 3, and provides a view of circuit and/or antenna 304 and pattern 305 beneath facestock and release line 306.

Figure 4:
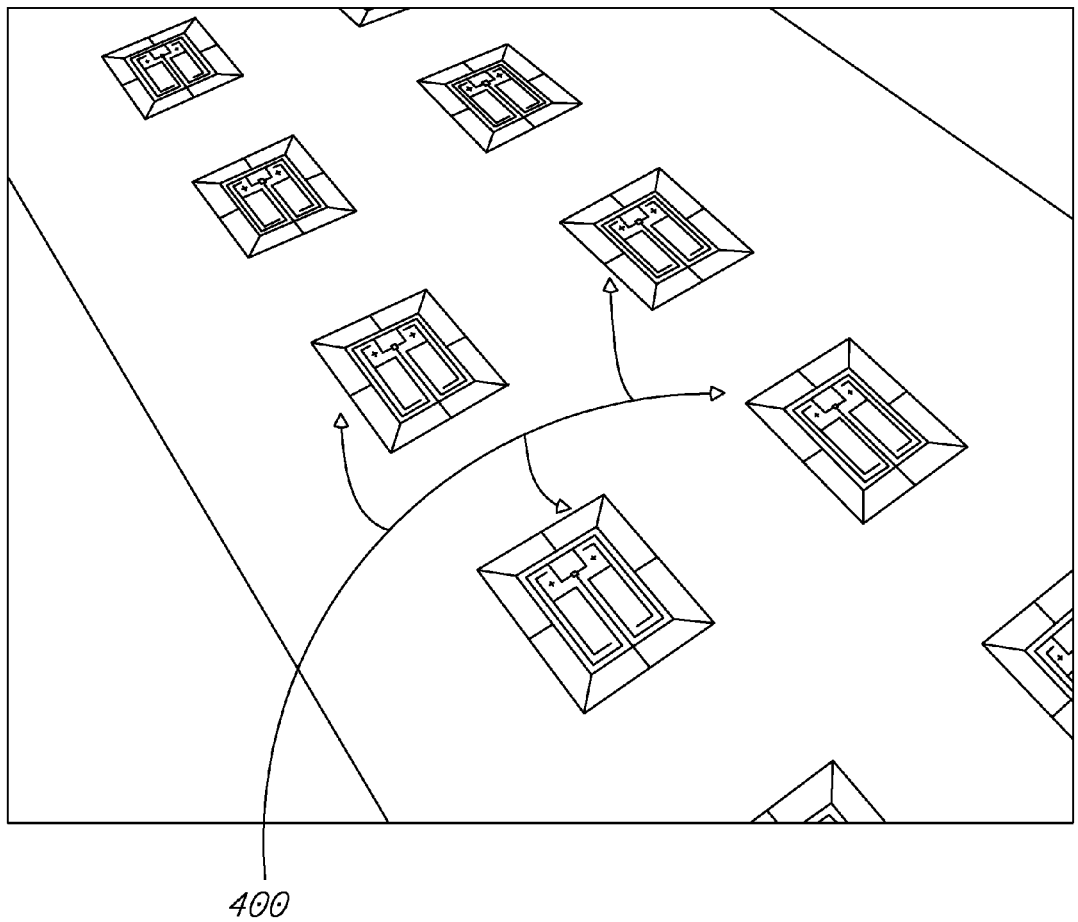
FIG. 4 is an exemplary diagram showing a group of RFID inlays.

Further, in the exemplary embodiment shown in FIG. 4, a group of laminate substrates with a circuit/antenna and starburst pattern 400 may be shown. This group may be formed substantially using the techniques described herein.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An RFID inlay comprising:
a matrix-less inlay substrate having a pattern;
an antenna disposed on the substrate attached to a chip, the antenna distinct from the pattern;
wherein the pattern surrounds the antenna and the pattern prevents warping of the substrate; and
the pattern and the antenna are made by a laser cutting such that the pattern are cut lines made during a laser ablation process and the cut lines are formed about every 45 degrees extending outward from the inlay.

2. The inlay of claim 1, wherein the pattern is a starburst pattern.

3. The inlay of claim 1, wherein the pattern is formed concurrently with the antenna.

4. The inlay of claim 1, wherein the pattern is part of a same process as forming the antenna.

5. The inlay of claim 1, wherein the inlay is 7 mm by 9 mm.

6. The inlay of claim 1, wherein the substrate is a PET material with an aluminum laminate.

7. The inlay of claim 1, wherein the pattern is electrically inert.

8. The inlay of claim 4, wherein the pattern is larger than a label footprint.

9. A method of forming a matrix-less RFID inlay comprising the steps of:
providing a substrate for an inlay, a chip, and an antenna;
providing a facestock and release liner;
providing the substrate;
cutting a pattern, the pattern preventing warping of the substrate during at least one of cutting, conversion or chip attaching;
forming the antenna wherein the pattern surrounds the antenna;
attaching a chip to the antenna; and
adding a facestock and release liner over the antenna and the pattern.

10. The method of claim 9, wherein the forming of the antenna and the pattern is done by laser ablation.

11. The method of claim 9, wherein the pattern is a starburst pattern.

12. The method of claim 9, wherein the facestock and liner cover the antenna and the pattern.

13. The method of claim 9, wherein the pattern surrounds the antenna.

14. The method of claim 9, further comprising die cutting to remove portions of facestock and substrate, and the pattern.

15. The method of claim 9, wherein the pattern is altered as a result of a size of a label to which the inlay is coupled.

16. The method of claim 9, wherein the pattern is formed as a loop around the antenna.

17. A RFID inlay comprising:
   a matrix-less inlay substrate having a pattern;
   an antenna disposed on the substrate attached to a chip, the antenna distinct from the pattern;
   wherein the pattern surrounds the antenna and extends outwardly from the antenna at about 45 degrees and the pattern prevents warping of the substrate; and
   the pattern and the antenna are made by a laser cutting.

* * * * *